May 14, 1968 J. A. MEIJS ET AL 3,383,361
PROCESS FOR SEPARATING A POLYARYLENE ETHER FROM
A SOLUTION THEREOF IN TOLUENE
Filed Feb. 14, 1966
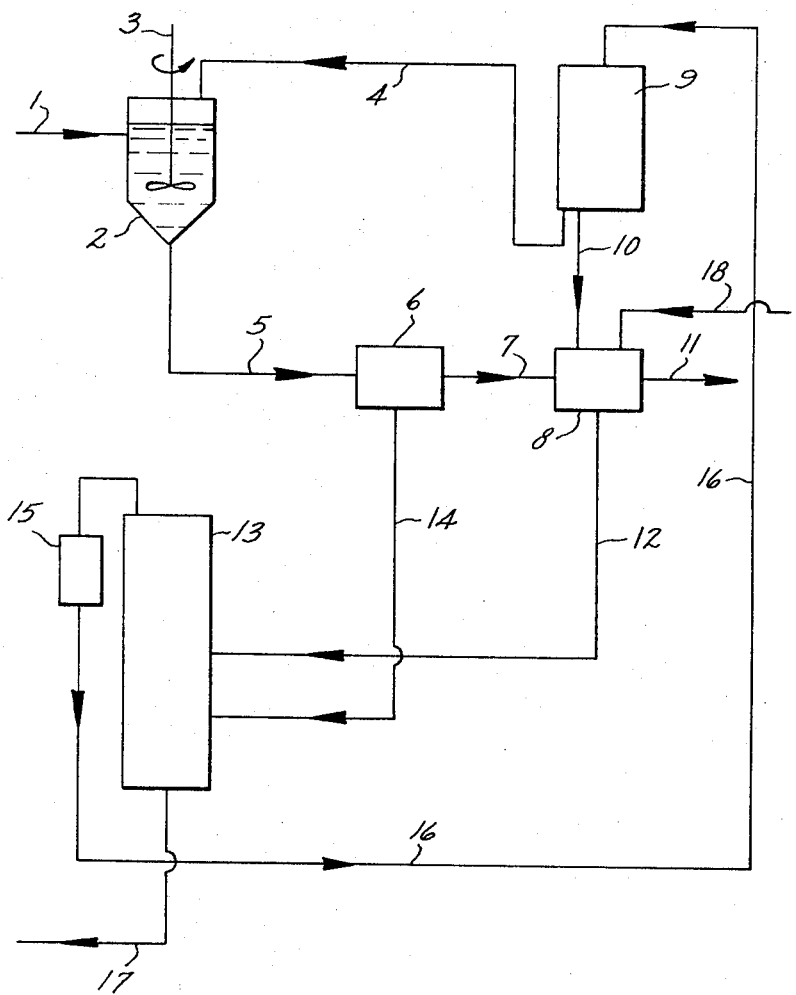
Inventors:
Jan A. Meijs,
Franciscus I. M. Van Haaren.
by Allard A. Braddock
Attorney

United States Patent Office 3,383,361
Patented May 14, 1968

3,383,361
PROCESS FOR SEPARATING A POLYARYLENE ETHER FROM A SOLUTION THEREOF IN TOLUENE
Jan A. Meijs, Arnhem, and Franciscus I. M. Van Haaren, Velp, Netherlands, assignors to N.V. Onderzoekingsinstituut Research, Arnhem, Netherlands, a Dutch corporation
Filed Feb. 14, 1966, Ser. No. 527,238
2 Claims. (Cl. 260—47)

ABSTRACT OF THE DISCLOSURE

A polyarylene ether is separated from a toluene solution thereof by adding a precipitant consisting of methanol-toluene azeotrope, filtering to remove the polyether, and distilling the filtrate to reconstitute the azeotrope for use in further separation.

---

The invention relates to a process for separating a polyarylene ether from a solution thereof in toluene by adding to this solution a precipitant and separating the resulting polyarylene ether precipitate from the liquid, after which the precipitant is recovered from the liquid from which the polymer has been separated in order to be used again as a precipitant.

Polyarylene ethers are mostly obtained in the form of a solution. The polymer is generally separated from this solution by the above-indicated addition thereto of a precipitant.

Processes for the preparation of polyarylene ethers are described, inter alia, in the British patent specification No. 930,993, in which mention is made of a large number of polyarylene ethers and in which as a solvent mention is made, inter alia, of toluene. One of the precipitants mentioned in this specification is methanol.

In the preparation of polyarylene ethers on an industrial scale it is for technical and economical reasons advantageous to use as a solvent toluene and as a precipitant methanol.

Recovering the precipitant from the liquid from which the polymer has been separated is in that case rather costly because it is necessary first to add water to the mixture of toluene and methanol in order to obtain a two-phase system, one phase of which substantially consists of toluene and the other phase substantially of a water-methanol mixture. By means of distillation pure toluene can be won from the first phase and pure methanol be recovered from the second phase and be used again as precipitant. Especially the recovery of methanol from the methanol-water mixture involves high energy costs.

According to the invention the process for separating polyarylene ethers from a solution thereof in toluene followed by recovering the liquids used can be carried out in a manner which is much simpler and far more economical than the process indicated above.

The process according to the invention is characterized in that in separating polyarylene ether from a solution thereof in toluene the precipitant used is a liquid which comprises a methanol-toluene mixture of azeotropic composition, which mixture is distilled off from the liquid from which the precipitated polymer has been separated.

The advantage of the process according to the invention is in the first place that the relatively costly separation of methanol from water is no longer necessary.

An additional, but also considerable advantage is that in the process according to the invention the polymer is preciptated in a form in which it can particularly easily be washed. This makes the washing process much simpler and above all less costly since per unit of weight polymer less washing liquid is required.

When the mixture from which the polymer has been separated, which mixture substantially consists of methanol and toluene, is subjected to distillation a mixture of azeotropic composition can be distilled over until a methanol-free liquid remains. This methanol-free liquid can be distilled in a simple manner, pure toluene being obtained, which may be used, for instance, as a reaction medium in the oxidative polymerization.

The precipitated polymer will generally be washed, for which in the process according to the invention it is preferred to use a methanol-containing liquid. After use, the washing liquid may be added to the liquid from which the polymer has been separated and the resulting mixture subjected to distillation. As washing liquid it is preferred to use a liquid of the same composition as the precipitant.

The process according to the invention is further described with the aid of the following example.

EXAMPLE

In an apparatus schematically represented in the accompanying figure poly-(2,6-dimethylphenylene oxide) dissolved in toluene is separated from the solution and washed.

In the figure the reference number 1 refers to the supply line for the polymer solution which, in a precipitation vessel 2 provided with a stirrer, is contacted with the precipitant which is fed into the precipitation vessel 2 through a supply line 4. As a result, the polymer precipitates. The resulting suspension is, through a discharge line 5, fed to a centrifuge 6 in which the precipitate is separated from the liquid. The precipitate is carried off by way of a discharge member 7 and washed in a washing tank 8 with liquid fed from a supply vessel 9 to the washing tank 8 through a supply line 10.

The washed precipitate is discharged from the washing tank 8 by way of a line 11 and the used washing liquid is passed through a line 12 to a distillation column 13. The liquid separated in the centrifuge 6 is passed through a line 14 to the distillation column 13. The upper fraction of the distillation column is passed through a condenser 15 and a line 16 to the supply vessel 9.

The lower fraction is discharged through a line 17. After distillation, said lower fraction may again serve as a solvent for the polymer. Methanol is supplied through a line 18 to compensate for the methanol which leaves the system together with the polymer through the line 11.

The following table shows the compositions of the products passing through the various members of the apparatus when the plant is in continuous operation. Through the line 1 the reaction mixture is supplied which is obtained from a continuous reactor in which 2,6-dimethylphenol, in a solution of toluene and in the presence of a copper-amine complex, has oxidized under the influence of air. Said reaction mixture contains poly(2,6-dimethylphenylene oxide) dissolved in toluene and also catalyst rests, by-products, etc., which will hereinafter be referred to as "impurities."

The figures in the table are parts by weight per unit of time.

EXPERIMENT A

| Line No. | Polymer | Toluene | Methanol | Impurity |
|---|---|---|---|---|
| 1 | 8 | 100 | | 3 |
| 4 | | 31 | 69 | |
| 5 | 8 | 131 | 69 | 3 |
| 7 | 8 | 5 | 3 | 0.1 |
| 14 | | 126 | 66 | 2.9 |
| 10 | | 19 | 42.3 | |
| 11 | 8 | 5 | 3 | |
| 12 | | 19 | 45.3 | 0.1 |
| 16 | | 50 | 111.3 | |
| 17 | | 95 | | 3 |
| 18 | | | 3 | |

It will be clear that the scope of the present invention is not limited by the above example but allows of many variations. For instance, precipitation may take place in various vessels; or other proportions may be chosen than the ones indicated; and the liquids used for the washing process may differ from the one mentioned above. An essential feature of the present invention is that the liquid used as a precipitant should substantially consist of the mixture of azeotropic composition which is formed in distilling the liquid from which the polymer has been separated.

What we claim as new and desire to secure by Letters Patent of the United States is:

1. A process for separating a polyarylene ether from a solution thereof in toluene by adding to this solution a precipitant and separating the resulting polyarylene ether precipitate from the liquid, after which the precipitant is recovered from the liquid from which the polymer has been separated, characterized in that in separating the polyarylene ether from a solution thereof in toluene the precipitant used is a liquid which consists substantially of a methanol-toluene mixture of azeotropic composition, which mixture is distilled off from the liquid from which the precipitated polymer has been separated.

2. A process according to claim 1, characterized in that the precipitated polymer is washed with methanol or with a mixture of methanol and toluene, after which the washing liquid is added to the liquid from which the polymer has been separated and the resulting mixture is subjected to distillation.

No references cited.

WILLIAM H. SHORT, *Primary Examiner.*

M. GOLDSTEIN, *Assistant Examiner.*